G. H. BACKMIRE.
Egg-Beater.
No. 221,016. Patented Oct. 28, 1879.
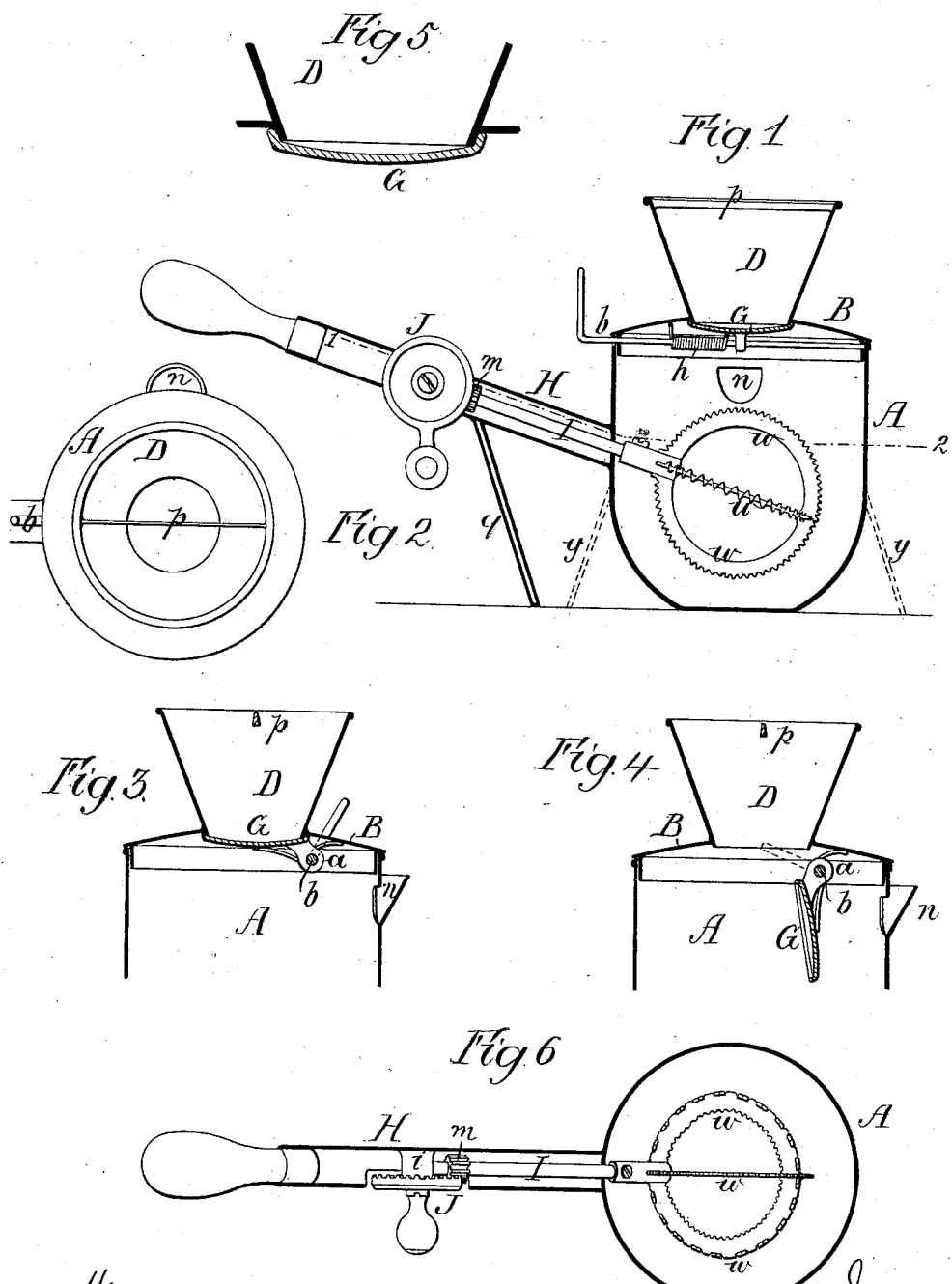

UNITED STATES PATENT OFFICE.

GEORGE H. BACKMIRE, OF PHILADELPHIA, PENNSYLVANIA.

IMPROVEMENT IN EGG-BEATERS.

Specification forming part of Letters Patent No. 221,016, dated October 28, 1879; application filed October 2, 1879.

*To all whom it may concern:*

Be it known that I, GEORGE H. BACKMIRE, of Philadelphia, Pennsylvania, have invented a new and useful Improvement in Egg-Beaters, of which the following is a specification.

The main object of my invention is to combine in one egg-beating implement the vessel for containing the eggs, a handle by which the vessel can be manipulated, and mechanism for beating the eggs.

A further object of my invention is to afford facilities for disposing of the contents of bad eggs before they can be introduced into the beating vessel or receptacle.

I will proceed to describe the manner in which these objects and others of a minor character are attained, reference being had to the accompanying drawings, in which—

Figure 1 is a vertical section of my improved egg-beater; Fig. 2, a plan view of part of the same; Figs. 3 and 4, vertical sections of parts of the vessel and receiver, showing the valve in different positions; Fig. 5, a detached view of part of Fig. 3; and Fig. 6, a sectional plan on the line 1 2, Fig. 1.

A is a vessel in which the eggs are beaten, and to the upper edge of this vessel is snugly fitted a detachable cover, B, to the top of which is attached the hopper or receiver D, the latter, when the valve G is depressed, communicating with the interior of the vessel A. This valve consists of a circular plate, preferably of concavo-convex form, its edges being turned up, so as to form an annular flange, which fits over that portion of the receiver which projects through the cover, the flange being arranged to fit snugly against the under side of the cover, as best observed in Fig. 5.

A projection, $a$, on the valve is secured to a spindle, $b$, which has its bearings in the flange of the cover, and which is bent at one end to form a handle.

A spring, $h$, is coiled around the handle and tends to close the valve, one end of the wire of which the spring is composed being secured to the cover B, and the other end coiled around the said spindle and attached to the valve G.

A tubular handle, H, projects from the vessel A, and this handle contains a shaft, I, which has its bearing at one end in the said vessel A, and at the other end in a block, $i$, secured to the interior of the handle.

A wheel, J, on a pin screwed into this block gears into a pinion, $m$, on the shaft, a portion of which projects a short distance into the interior of the vessel A, and to this projecting portion is secured the stirring or beating device, consisting in the present instance of two flat rings, $w$, arranged at right angles to each other and having serrated edges.

Near the upper edge of the vessel, below the cover, is a spout, $n$, for a purpose rendered apparent hereinafter, and across the top of the receiver extends a bar, $p$.

The vessel is preferably made partly rounding at the bottom, as shown, and in order that it may rest steadily on a table the handle is provided with a leg, $q$, which, however, may be dispensed with if an extended base (indicated by the dotted lines $y\ y$) be added to the vessel.

In using the implement it is placed on a table, as shown in Fig. 1, and an egg is cracked by striking it against the cross-bar $p$, and its contents permitted to fall into the receiver. Should the egg prove to be bad the operator at once turns it out of the receiver by tilting the vessel A, the handle H being used for this purpose; but should the egg be good the operator opens the valve and permits the contents of the egg to pass into the said vessel. After the contents of as many eggs as may be required have been deposited in the vessel, the operator seizes the handle H with one hand and turns the wheel J, which has a suitable handle, with the other hand, thereby causing the stirring or beating device to revolve rapidly and to soon reduce the eggs to the desired condition, after which the vessel may be so tilted that the beaten eggs will flow from the spout $n$ into any desired receptacle. The contents of another batch of eggs may then be treated in a similar manner, or the implement may be laid on one side after water has been introduced into the vessel for effecting the cleansing of the same before the implement is again used.

The cover and receiver D, with its valve, might be used in connection with the vessel A without the beating device when the beating of the eggs is not desired.

The beating device may consist of more than two rings, w; but this number has been found to give good results in practice, and is preferred.

A solid handle may also be used in place of the tubular handle, in which case the shaft I will be adapted to bearings projecting from the said solid handle.

I claim as my invention—

1. An egg-beater in which a vessel, A, having a handle, H, and a shaft, I, provided with a stirring or beating device contained within the vessel, are combined with mechanism for driving the said shaft, all substantially as described.

2. The combination of the vessel A, having a tubular handle, H, the shaft I, contained within the handle and having a stirring device within the vessel, and the driving-wheel J, carried by the handle and gearing with a pinion on the said shaft, all substantially as set forth.

3. The combination of the vessel A with a cover, B, receiver D, self-closing valve G, and mechanism for operating the said valve, all substantially as specified.

4. The within-described stirring and beating device, composed of two or more serrated rings arranged in respect to each other as set forth, and secured to a shaft, I, as described.

In testimony whereof I have signed my name to this specification in the presence of two subscribing witnesses.

GE. H. BACKMIRE.

Witnesses:
ALEXANDER PATTERSON,
HARRY SMITH.